United States Patent [19]
Niedospial, Jr.

[11] Patent Number: 4,948,063
[45] Date of Patent: Aug. 14, 1990

[54] FILM CASSETTE

[75] Inventor: John J. Niedospial, Jr., Rochester, N.Y.

[73] Assignee: Eastman Kodak Company, Rochester, N.Y.

[21] Appl. No.: 415,750

[22] Filed: Oct. 2, 1989

[51] Int. Cl.$^5$ .............................................. G03B 17/26
[52] U.S. Cl. ..................... 242/71.1; 354/275
[58] Field of Search ................. 242/71, 71.1; 354/275

[56] References Cited

U.S. PATENT DOCUMENTS

| | | |
|---|---|---|
| 988,341 | 4/1911 | Hill . |
| 2,541,476 | 2/1951 | Mihalyi ................................ 242/71 |
| 3,334,024 | 2/1966 | Leinonen ............................... 96/78 |
| 3,659,799 | 5/1972 | Cerutti et al. ....................... 242/71.9 |
| 3,677,499 | 7/1972 | Wangerin ............................ 242/210 |
| 3,797,777 | 3/1974 | Hosono et al. ..................... 242/197 |
| 4,407,579 | 10/1983 | Huff ................................ 242/71.1 X |
| 4,423,943 | 1/1984 | Gold ..................................... 354/275 |
| 4,488,796 | 12/1984 | Edwards ............................. 354/275 |
| 4,516,844 | 5/1985 | Kee et al. ............................ 354/275 |
| 4,705,375 | 11/1987 | Kirigaya et al. .............. 242/71.1 X |
| 4,834,306 | 5/1989 | Robertson et al. ................ 242/71.1 |

Primary Examiner—Stuart S. Levy
Assistant Examiner—Steven M. duBois
Attorney, Agent, or Firm—Roger A. Fields

[57] ABSTRACT

A film cassette is disclosed wherein a film roll whose outermost convolution comprises a film leader is coiled about a spool rotatable within the cassette shell, a pair of flexible flanges are coaxially arranged on the spool to radially confine the film leader within respective skirted peripheries of the flanges to prevent the leader from substantially contacting an interior wall of the cassette shell, and a film stripper projecting from the interior wall is received between a leading end of the film leader and the next-inward convolution of the film roll to free successive sections of the leader from the flanges by inducing the leader to flex the flanges away from one another at their skirted peripheries responsive to rotation of the spool in a film unwinding direction. A film flattening member projects from the interior wall of the cassette shell in the vicinity of the film stripper and a light-trapping passageway to the exterior of the shell to support successive sections of the film leader substantially flat as those sections are freed from the flanges, to facilitate initial and subsequent movement of the leader into the passageway.

5 Claims, 9 Drawing Sheets

FILM CASSETTE

CROSS-REFERENCE TO RELATED APPLICATIONS

Reference is made to commonly assigned copending applications Ser. No. 07/320,440, entitled FILM CASSETTE, and filed Mar. 8, 1989 in the name of John J. Niedospial, now U.S. Pat. No. 4,883,235, issued Nov. 28, 1989, and Ser. No. 07/320,438, entitled FILM CASSETTE, and filed Mar. 8, 1989 in the names of Christopher T. Mattson and John J. Niedospial.

BACKGROUND OF THE INVENTION

1. Field of the Invention

The invention relates generally to the field of photography, and particularly to a film cassette containing roll film. More specifically, the invention relates to a film cassette that is capable of automatically advancing a non-protruding film leader to the exterior of the cassette shell responsive to unwinding rotation of a film spool within the shell.

2. Description of the Prior Art

In conventional 35 mm film manufacturers' cassettes, such as manufactured by Eastman Kodak Co. and Fuji Photo Film Co. Ltd., the filmstrip is wound on a flanged spool which is rotatably supported within a cylindrical shell. A leading or forward-most section of the filmstrip approximately 2 1/3 inches long, commonly referred to as a "film leader", normally protrudes from a light-trapped slit or mouth of the cassette shell. One end of the spool has a short axial extension which projects from the shell, enabling the spool to be turned by hand. If the spool is initially rotated in an unwinding direction, the film roll inside the shell will tend to expand radially since the inner end of the filmstrip is attached to the spool, and the fogged leader section protruding from the slit will remain stationary. The film roll can expand radially until a firm non-slipping relation is established between its outermost convolution and the inner curved wall of the shell. Once this non-slipping relation exists, there is a binding effect between the film roll and the shell which prevents further rotation of the spool in the unwinding direction. Thus, rotation of the spool in the unwinding direction cannot serve to advance the filmstrip out of the shell, and it is necessary in the typical 35 mm camera to engage the protruding leader section to draw the filmstrip out of the shell.

A 35 mm film cassette has been proposed which, unlike conventional film cassettes, can be operated to automatically advance a film leader out of the cassette shell by rotating the film spool in the unwinding direction. The film leader originally is located entirely inside the cassette shell. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner curved wall of the cassette shell. The trailing end of the filmstrip is secured to the film spool, and the forward or leading end of the filmstrip is slightly tapered purportedly to allow it to freely extend from between the circumferential lips and rest against the shell wall at a location inwardly of a non-light-tight film passageway to the outside of the cassette shell. During initial unwinding rotation of the film spool, the leading end of the filmstrip is advanced along the shell wall until it reaches an inner entrance to the film passageway. Then, it is advanced into and through the film passageway to the outside of the cassette shell. The passageway has a width that is less than the width of the filmstrip, thus resulting in the filmstrip being transversely bowed as it is uncoiled from the film spool, and thereby facilitating movement of the film edges under the circumferential lips of the respective flanges. However, severe transverse bowing of the filmstrip in order to move its longitudinal edges under the circumferential lips may damage the filmstrip.

Like the type of film cassette disclosed in U.S. Pat. No. 4,423,923, commonly assigned U.S. Pats. No. 4,834,306, granted May 30, 1989, and U.S. Pat. No. 4,848,693, granted Jul. 18, 1989, each disclose a film cassette that is capable of automatically advancing a non-protruding film leader to the outside of the cassette shell in response to rotation of the film spool in the unwinding direction. Specifically, there is disclosed a film cassette wherein a film roll is wound on a spool between a pair of coaxially spaced, independently rotatable flanges. The two flanges have respective circumferential annular lips which prevent the outermost convolution of the film roll, including its leading end, from clock-springing into contact with the interior wall of the cassette shell. When the spool is initially rotated in the unwinding direction, the flanges may momentarily remain stationary and the film roll, since its inner end is secured to the spool, tends to expand radially to ensure a firm non-slipping relation between the outermost convolution and the annular lips. Once the non-slipping relation exists, continued rotation of the spool will similarly rotate the flanges. This allows stationary internal spreaders to deflect successive portions of the annular lips to an axial dimension exceeding the film width, in turn allowing the leading end and successive sections of the film roll to be freed from the radial confinement of the annular lips and to be advanced into and through a light-tight film passageway to the outside of the cassette shell. A stripper-guide is located adjacent an inner entrance to the film passageway to divert the leading end of the film roll into the passageway. To accomplish this, the stripper-guide must be received between the leading end and the next-inward convolution of the film roll. If, however, the film cassette is used during extremely high temperature and/or humidity conditions, it might be possible that the leading end after being freed from the radial confinement of the annular lips will retain a great deal of inward curl. Consequently, the leading end will not have sufficient clock-spring to separate sufficiently from the next-inward convolution to move over the stripper-guide. Thus, when the spool is rotated in the unwinding direction, the leading end may not be picked up by the stripper-guide and guided into the film passageway. Another problem is that the leading end may be slightly transversely bowed after being freed from the annular lips. Thus, when the leading end is moved over the stripper-guide, the leading end may stub at the inner entrance to the film passageway.

The Cross-Referenced Applications

The cross-referenced applications each disclose a film cassette wherein a film roll whose outermost convolution is a film leader is coiled about a spool rotatable within the cassette shell, a pair of flexible flanges are coaxially arranged on the spool to radially confine the film leader within respective skirted peripheries of the flanges to prevent the leader from substantially contacting an interior wall of the cassette shell, and a film stripper-guide projecting from the interior wall is received between a leading end of the film leader and the next-inward convolution of the film roll to free the leader from the flanges and guide the leader through a light-tight film passageway to the exterior of the cassette shell responsive to rotation of the spool in a film unwinding direction. Specifically, the stripper-guide frees the film leader from the flexible flanges by inducing the leader to flex the flanges away from one another at their skirted peripheries during unwinding rotation of the spool. Moreover, the film leader and at least one of the flanges include mutual engagement means for maintaining the leading end of the leader spaced at least a minimum radial distance from the next-inward convolution of the film roll sufficient to locate the leading end within range of the stripper-guide, to ensure that the leading end will be advanced over the stripper-guide responsive to rotation of the spool in the film unwinding direction. This is in contrast to U.S. Pats. No. 4,834,306 and U.S. Pat. No. 4,848,693 wherein the leading end of the film leader may not have sufficient clock-spring to be picked up by the stripper-guide when the spool is rotated in the unwinding direction.

SUMMARY OF THE INVENTION

According to the invention, a film cassette is provided wherein a spool is rotatable within a cassette shell, a convoluted film roll whose outermost convolution comprises a film leader is coiled about the spool, a pair of flanges are coaxially arranged on the spool to radially confine the film leader within respective skirted peripheries of the flange to prevent the leader from substantially contacting an interior wall of the cassette shell, and a film stripper projecting from the interior wall is received between the film leader and the next-inward convolution of the film roll to remove successive sections of the leader from the flanges responsive to rotation of the spool in a film unwinding direction, to allow the leader to enter an essentially non-curving light-tight passageway to the exterior of the cassette shell, characterized in that:

film flattening means projects from the interior wall of the cassette shell in the vicinity of the film stripper and the non-curving passageway for supporting successive sections of the film leader substantially flat as those sections are freed from the flanges, to facilitate initial and subsequent movement of the leader into the non-curving passageway.

According to a further feature of the invention, the flanges are sufficiently flexible to allow the film leader to flex the flanges away from one another at their skirted peripheries, when the spool is rotated in the film unwinding direction with the film stripper received between the leader and the next-inward convolution of the film roll, to free successive sections of the leader from the flanges.

DETAILED DESCRIPTION OF THE PREFERRED EMBODIMENT

The invention is disclosed as being embodied preferably in a 35 mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
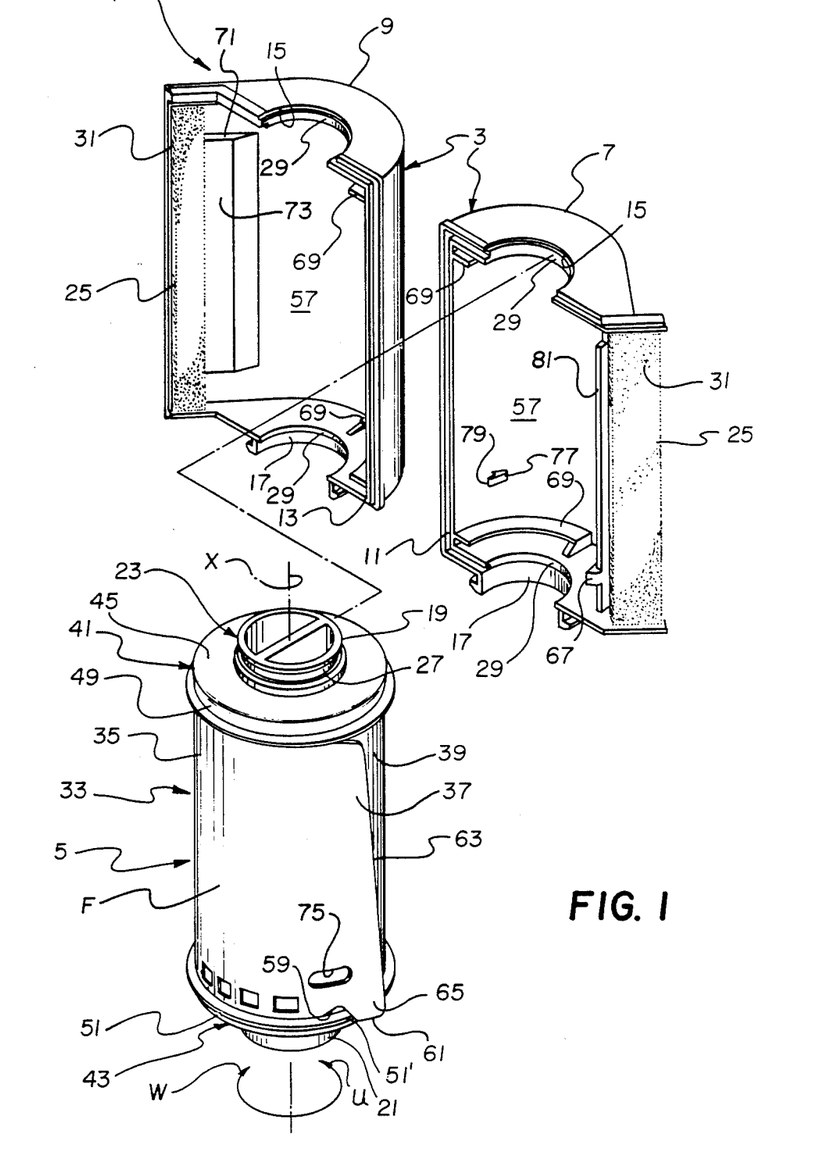
FIG. 1 is an exploded perspective view of a film cassette according to a preferred embodiment of the invention.
Figure 2:
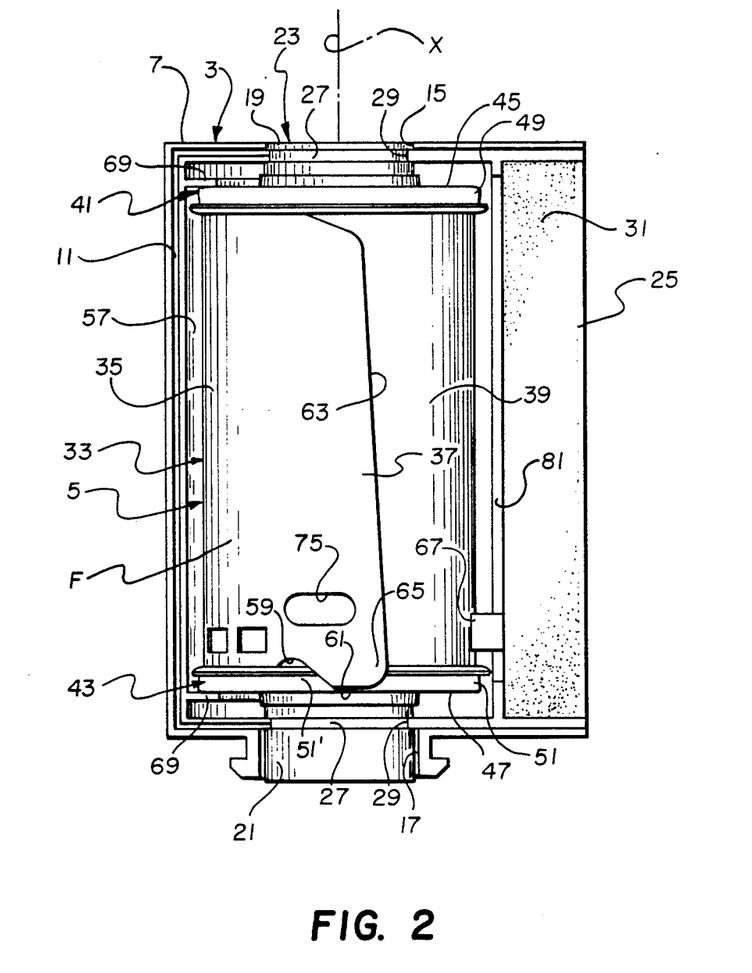
FIG. 2 is an elevation view of the film cassette, illustrating the cassette shell open to reveal a film roll coiled about a film spool.

Referring now to the drawings, FIGS. 1 and 2 depict an improved 35 mm film cassette 1 comprising a light-tight cassette shell 3 and a film spool 5 which is rotatable about an axis X in film unwinding and winding directions U and W within the cassette shell. The cassette shell 3 consists of two shell halves 7 and 9 which are mated along respective grooved and stepped edge portions 11 and 13. The mated halves 7 and 9 define upper and lower aligned circular openings 15 and 17 for relatively shorter and longer opposite end extensions 19 and 21 of a spool core or hub 23, and they define a narrow relatively-straight film passageway 25 to the exterior of the cassette shell 3. The longer and shorter end extensions 19 and 21 of the spool core 23 each include an annular groove 27 which mates with a corresponding edge 29 of the respective openings 15 and 17 to rotatably support the film spool 5 for rotation about the axis X in the film unwinding and winding directions U and W. A known black velvet or plush material 31 lines the interior of the film passageway 25 to prevent ambient light from entering the film passageway.

Figure 3:
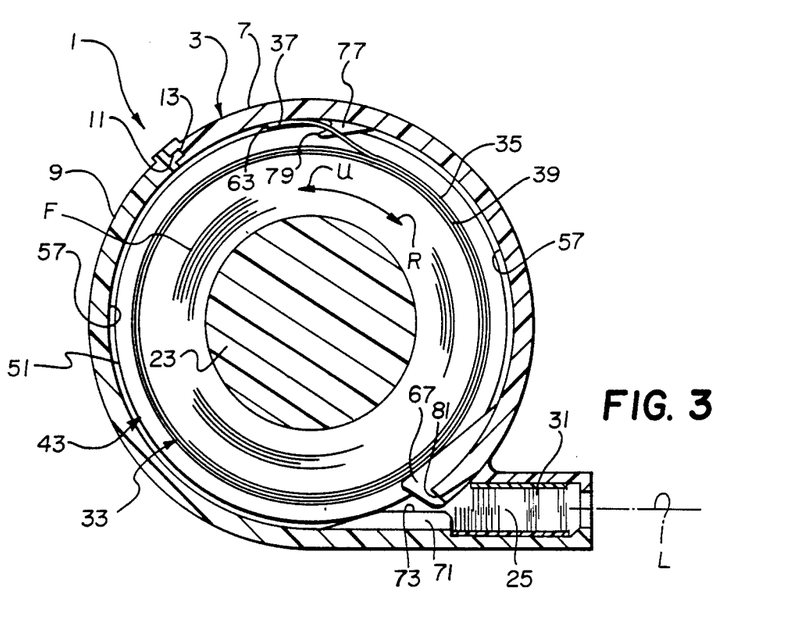
FIG. 3 is an end view partly in cross-section of the cassette shell, the film roll, and the film spool, illustrating the manner in which the film roll is originally stored on the film spool.

A roll 33 of 35 mm filmstrip F is coiled about the spool core 23 to form successive film convolutions. As shown in FIG. 3, the film roll 33 includes an outermost convolution which comprises a film leader 35 having a leading or forward end 37, and it includes a next-inward convolution 39 coiled behind the outermost convolution. The inner or trailing end of an innermost convolution, not shown, of the film roll 33 is secured to the spool core 23.

Figure 8:
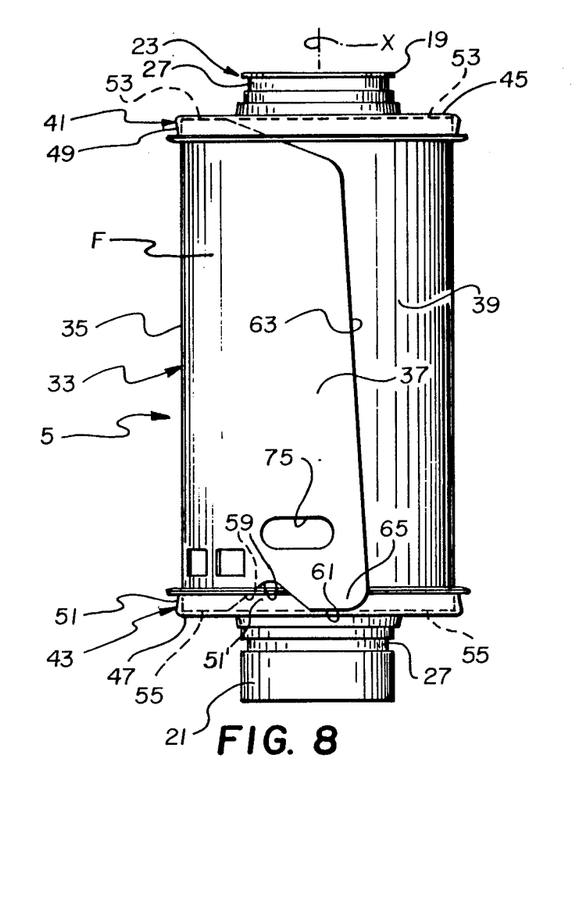
FIGS. 8 and 9 are elevation views of the film roll and the film spool, illustrating the manner in which the film roll is originally stored on the film spool.
Figure 9:
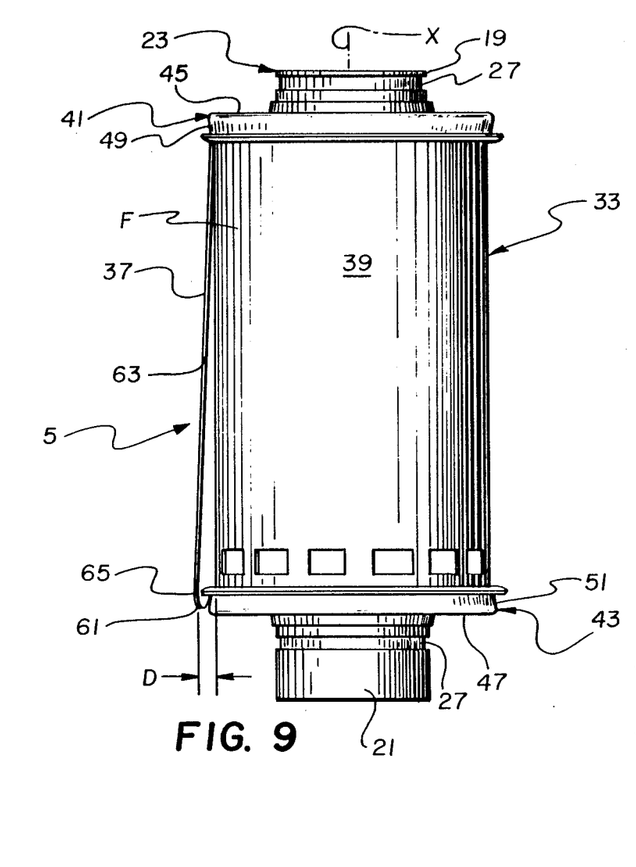
Figure 10:
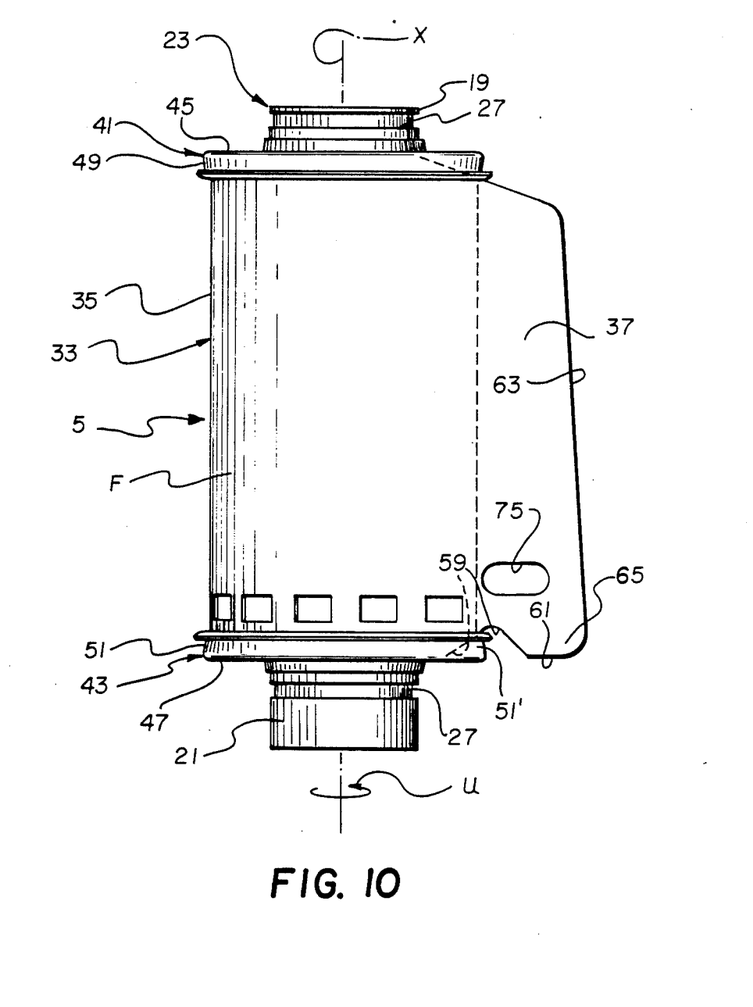
FIGS. 10 and 11 are elevation views similar to FIGS. 8 and 9, illustrating the manner in which the film roll is unwound from the film spool.

A pair of upper and lower identical, very thin, flexible film constraining flanges 41 and 43 are coaxially spaced along the spool core 23 as shown in FIGS. 1, 2, and 8. The two flanges 41 and 43 comprise respective integral disks 45 and 47 and respective integral annular lips or skirts 49 and 51 which circumferentially extend from the disks. The two disks 45 and 47 cover opposite flat sides, not shown, of the film roll 33 which are defined by corresponding opposite longitudinal edges 53 and 55 of each successive convolution of the film roll, and they have respective central holes, not shown, through which the spool core 23 axially extends to permit rotation of the spool core relative to the flanges 41 and 43. See FIG. 8. The annular lips 49 and 51 overlap the film leader (outermost convolution) 35 of the film roll 33 radially outwardly of the respective longitudinal edges 53 and 55 of the leader to radially confine the leader to thus prevent it from radially expanding or clock-springing into substantial contact with an interior curved wall 57 of the cassette shell 3. A lip-receiving notch 59 is cut in the film leader (outermost convolution) 35 along its longitudinal edge 55, relatively close to its leading end 37, to receive a peripheral section 51' of the annular lip 51. This allows a relatively short edge-section 61 of the film leader (outermost convolution) 35 connecting the leading end 37 and the notch 59 to overlap the annular lip 51 radially outwardly to thus maintain the leading end spaced a radial distance D from the next-inward convolution 39 of the film roll 33. See FIGS. 4 and 9. The leading end 37 has a forward edge 63 inclined from the longitudinal edge 53 of the film leader (outermost convolution) 35 to the other longitudinal edge 55 of the leader to form a forward-most tip or tab 65 of the leader which, like the edge-section 61, overlaps the annular lip 51 radially outwardly. See FIGS. 1, 2, 8 and 9.

Figure 4:
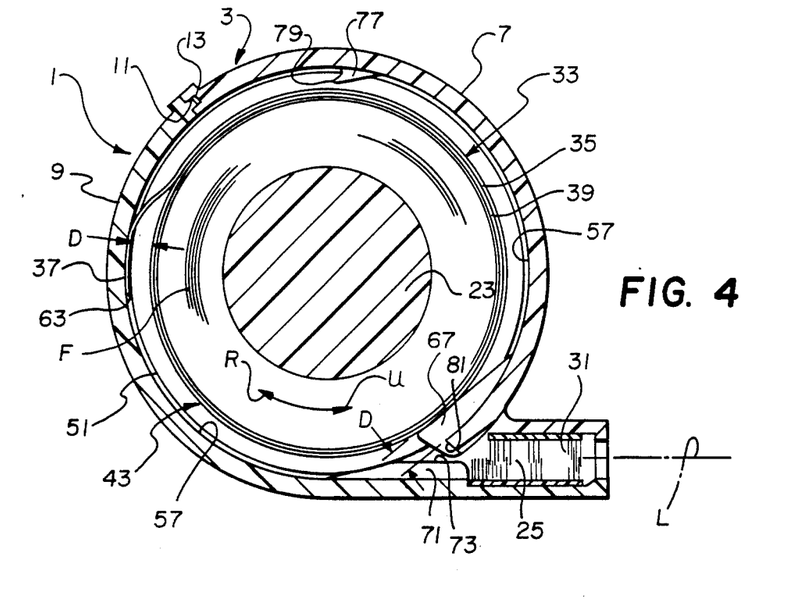
FIGS. 4, 5, 6 and 7 are end views similar to FIG. 3, illustrating the manner in which the film roll is unwound from the film spool.
Figure 5:
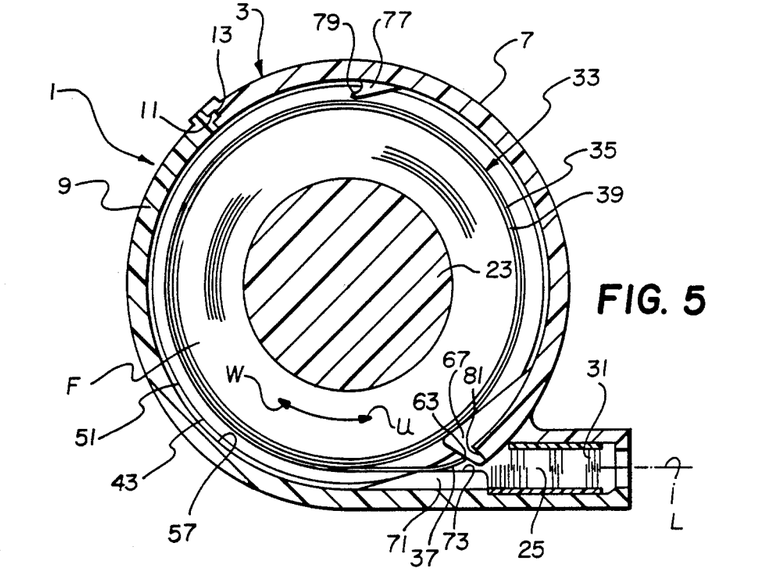

A film stripper-guide 67 projecting from the interior wall 57 of the cassette half 7 is positioned immediately inward of the inner entrance to the film passageway 25 to be received between the leading end 37 of the film leader (outermost convolution) 35 and the next-inward convolution 39, close to the forward-most tip 65 of the leader, to pick up the leading end and guide it into the film passageway responsive to rotation of the film spool 5 in the unwinding direction U. See FIGS. 1 and 4–7. The leading end 37 will be advanced over the stripper-guide 67 and into the film passageway 25, rather than between the stripper-guide and the next-inward convolution 39, because it is spaced the radial distance D from the latter convolution. Thus, as shown in FIG. 4, the leading end 37 will be located within range of the stripper-guide 67 due to such spacing D from the next-inward convolution 39.

Figure 11:
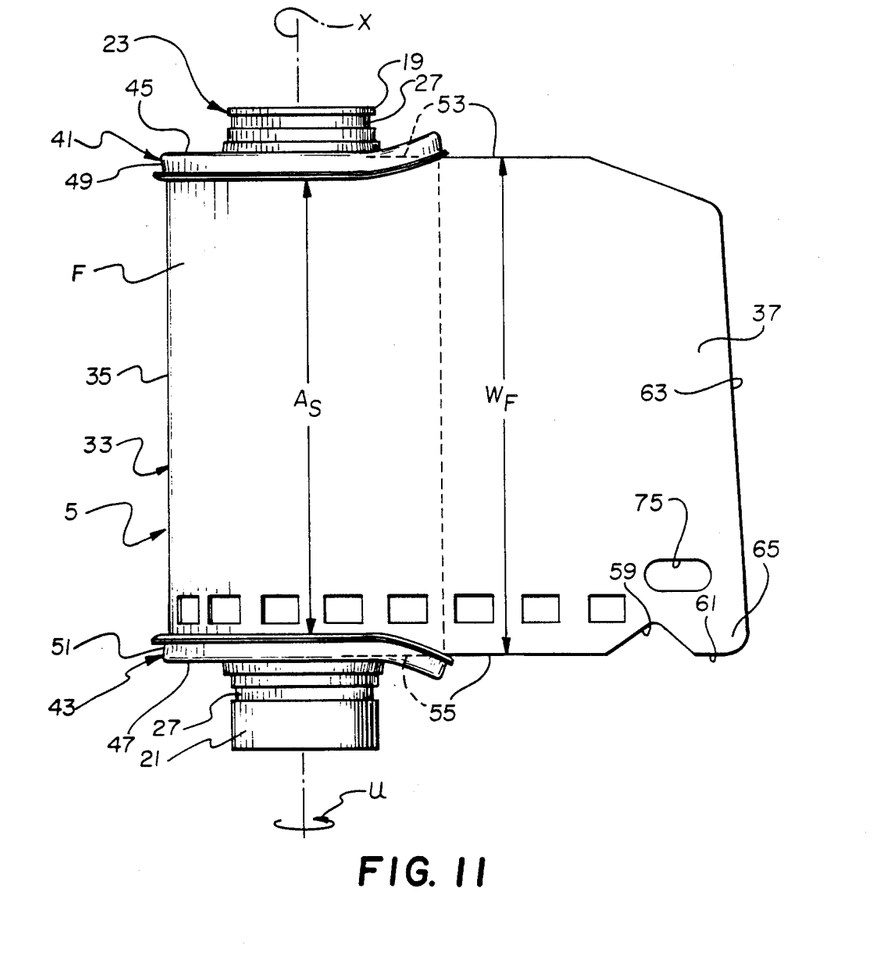

When the leading end 37 of the film leader (outermost convolution) 35 is advanced over the stripper-guide 67 responsive to rotation of the film spool 5 in the unwinding direction U, the longitudinal edges 53 and 55 of the leader start to gently flex respective arcuate portions of the two flanges 41 and 43 axially away from one another as shown in FIG. 11, first to allow the notch 59 to separate from the lip section 51', and then to allow successive longitudinal sections of the leader to exit from between the flanges to the outside of the cassette shell 3. The local flexing of the flanges 41 and 43 occurs because the film width $W_F$ between the longitudinal film edges 53 and 55 is slightly greater than the axial spacing $A_S$ between the annular lips 49 and 51. Moreover, successive convolutions of the film roll 33 have a resistance to transverse bowing that is greater than the resistance of the flanges 41 and 43 to be locally flexed. A pair of flat curved bearing members 69 extend from the interior wall 57 of the cassette shell 3 to lie flatly against successive arcuate portions of the two disks 45 and 47 as the flanges 41 and 43 are locally flexed axially away from one another, to thereby assure return of the flexed portions of the flanges to their normal original non-flexed condition. See FIGS. 1 and 2.

A film flattening member 71 projects from the interior wall 57 of the cassette half 9 in the vicinity of the inner entrance to the film passageway 25 and the stripper-guide 67 to support successive longitudinal sections of the film leader 35, beginning with its leading end 37, substantially flat as those sections are freed from the flanges 41 and 43, to facilitate movement of the leading end into the passageway. See FIGS. 6 and 7. The light-trapping plush 31 within the film passageway 25 is elevated along the passageway slightly beyond a longitudinal center line L of the passageway. The film flattening member 71 as shown in FIG. 3 projects almost to the center line L in order to support successive sections of the film leader 35 substantially flat at the center line. See FIGS. 6 and 7. Preferably, a substantially planar film-supporting face 73 of the flattening member 71 is spaced 0.005"–0.030" short of the center line L, and extends widthwise of the film passageway 25 as shown in FIG. 1.

A slot 75 is cut in the film leader 35 substantially proximate its leading end 37. A tooth 77 fixed to the interior wall 57 of the cassette half 7 has a free pointed end 79 which is positioned to be received in the slot 75 to thus engage the film leader (outermost convolution) 35, when the film spool 5 is rotated in the winding direction W as shown in FIG. 3, and to exit the slot to thus disengage the leader, when the film spool is rotated in the unwinding direction U as shown in FIG. 4. The engagement of the film leader (outermost convolution) 35 and the tooth 77 responsive to rotation of the film spool 5 in the winding direction W prevents the leading end 37 of the leader from coming to rest between the stripper-guide 67 and the next-inward convolution 39.

Operation

Figure 6:
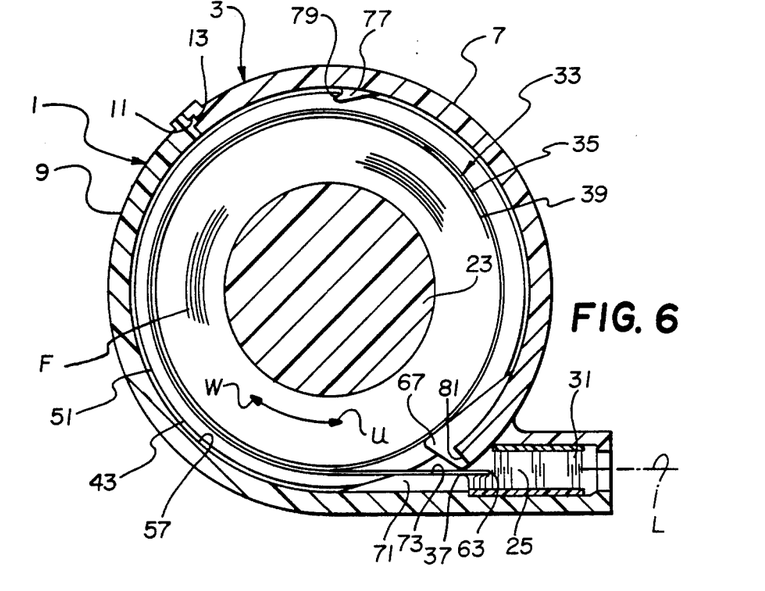
Figure 7:
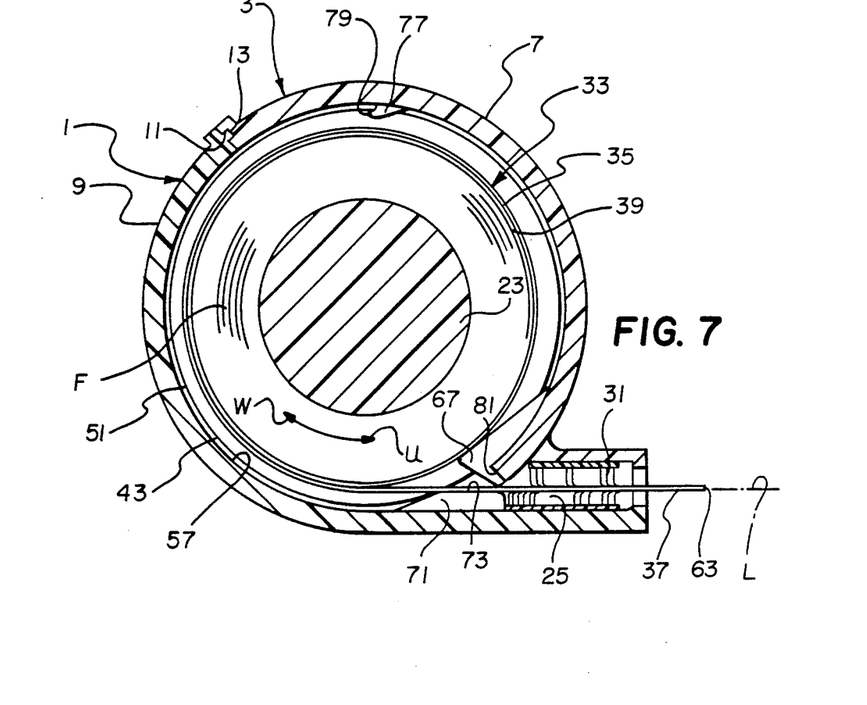

When the spool core 23 is initially rotated in the unwinding direction U, the two flanges 41 and 43 momentarily may remain stationary and the film roll 33, since its inner end is attached to the spool core, tends to expand radially or clock-spring to ensure a firm non-slipping relation between the film leader (outermost convolution) 35 and the annular lips 49 and 51 of the flanges. Then, further rotation of the spool core 23 will similarly rotate the flanges 41 and 43. As a result, the leading end 37 of the film leader (outermost convolution) 35 will be advanced over the stripper-guide 67, causing successive arcuate portions of the flanges 41 and 43 to be flexed axially away from one another as shown in FIG. 11. This first allows the notch 59 to separate from the lip section 51', and then it allows successive longitudinal sections of the film leader 35 to exit from between the flanges to the outside of the cassette shell 3. Since the stripper-guide 67 initially picks up the leading end 37 of the film leader 35 close to its forward-most tip 65, the forward edge 63 of the leading end might initially be supported along a narrow ridge 81 forming one end of the interior wall 57 of the cassette half 7. However, the leading end 37 will tend to back away from the ridge 81 and move against the film-supporting face 73 of the flattening member 71 as shown in FIG. 6.

If the film spool 5 is rotated in the winding direction W before substantially the entire length of the filmstrip is advanced to the outside of the cassette shell 3, and it is desired to subsequently use the remaining available portion of the filmstrip at a later time, the film spool is rotated substantially until the slot 75 receives the free end 79 of the tooth 77 to thus engage the film leader (outermost convolution) 35 to the tooth. Thereafter, to use the remaining available portion of the filmstrip, the film spool 5 is rotated in the unwinding direction U to disengage the film leader (outermost convolution) 35 from the tooth 77 and to re-advance the filmstrip to the outside of the cassette shell 3.

Alternate Embodiment

Figure 12:
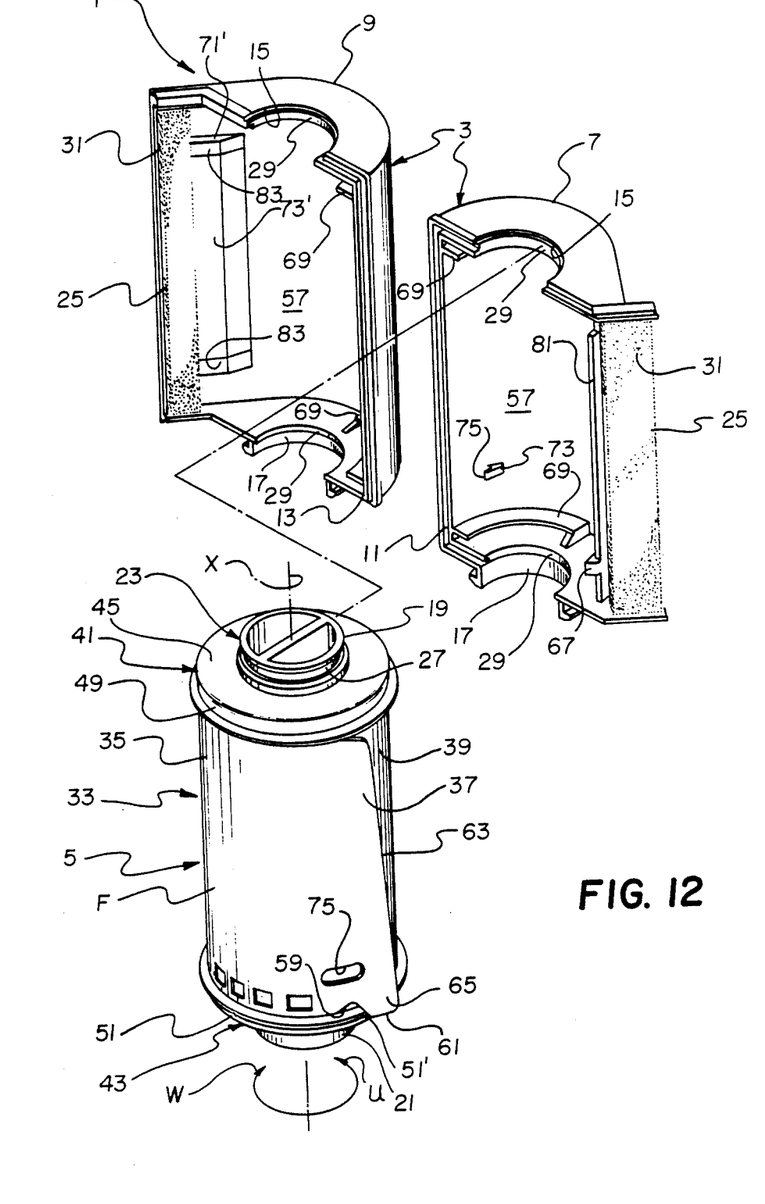
FIG. 12 is an exploded perspective view similar to FIG. 1, according to an alternate embodiment of the invention.

FIG. 12 shows an alternate embodiment of the film flattening member 71, which is designated as 71. According to this embodiment, the film flattening member 71' includes on its film-supporting face 73' a pair of very slightly raised ribs 83 arranged to support successive longitudinal sections of the film leader 35 proximate its longitudinal edges 53 and 55 to lessen the intimacy of contact between those sections and the film-supporting face 73'. Preferably, the ribs 83 are raised 0.005"-0.010" from the film-supporting face 73'.

The invention has been described with reference to a preferred alternate embodiments. However, it will be appreciated that variations and modifications can be effected within the ordinary skill in the art without departing from the scope of the invention.

I claim:

1. A film cassette wherein (a) a spool is rotatable within the cassette shell, (b) a convoluted film roll whose outermost convolution comprises a film leader is coiled about said spool, (c) a pair of flanges are coaxially arranged on said spool to normally radially confine said film roll coiled about the spool within respective skirted peripheries of said flanges to prevent said film leader from substantially uncurling into an annular space between said skirted peripheries and an interior curved wall of said cassette shell, and (d) a film stripper is received between said film leader and the next-inward convolution of said film roll to remove successive sections of the leader from said flanges responsive to rotation of said spool in a film unwinding direction, to allow the leader to enter an essentially non-curving light-tight passageway to the exterior of said cassette shell, characterized in that:

film flattening means is formed integrally with said interior curved wall of the cassette shell and projects from the curved wall into said annular space, only in the vicinity of said film stripper and said non-curving passageway, for supporting successive sections of said film leader substantially flat to facilitate initial and subsequent movement of the leader into the non-curving passageway; and said flanges are sufficiently flexible to allow said film leader to flex the flanges away from one another at their skirted peripheries, when said spool is rotated in the film unwinding direction with said film stripper received between the leader and the next-inward convolution of said film roll, to free successive sections of the leader from the flanges.

2. A film cassette as recited in claim 1, wherein said non-curving passageway is lined with a light-trapping plush that protrudes into the passageway at least to a longitudinal center line of the passageway, and said film flattening means includes a film flattening member that projects from the interior curved wall of said cassette shell almost to the longitudinal center line of the passageway to support successive sections of sail film leader substantially flat at the longitudinal center line.

3. A film cassette as recited in claim 2, wherein said film flattening member has a flat film-supporting face that longitudinally extends widthwise of said non-curving passageway to support successive sections of said film leader substantially flat across the passageway.

4. A film cassette as recited in claim 3, wherein said film-supporting face includes a pair of slightly raised rib-like members arranged on the film-supporting face to support successive sections of said film leader proximate respective longitudinal edges of the leader to lessen the intimacy of contact between those sections and the film-supporting face.

5. A film cassette as recited in claim 1, wherein said film flattening means includes a flat film flattening face that is arranged opposite said film stripper to support successive sections of said film leader substantially flat as those sections are moved over the stripper.

* * * * *